United States Patent [19]

Noguchi

[11] Patent Number: 5,680,265
[45] Date of Patent: Oct. 21, 1997

[54] CIRCUIT FOR DETECTING CONTACT OF MR HEAD WITH DISK SURFACE

[75] Inventor: Kenji Noguchi, Tokyo, Japan

[73] Assignee: Mitsubishi Denki Kabushiki Kaisha, Tokyo, Japan

[21] Appl. No.: 587,020

[22] Filed: Jan. 16, 1996

[30] Foreign Application Priority Data

Sep. 5, 1995 [JP] Japan ................................ 7-227738

[51] Int. Cl.⁶ .............................. G11B 5/09; G11B 5/02
[52] U.S. Cl. ........................... 360/46; 360/67; 360/113; 327/37; 327/173
[58] Field of Search ........................... 360/46, 65, 67, 360/68, 113; 327/34, 36, 37, 172, 173, 176

[56] References Cited

U.S. PATENT DOCUMENTS

| | | | |
|---|---|---|---|
| 3,906,379 | 9/1975 | Tuhro | 327/37 |
| 4,165,491 | 8/1979 | Geoffon | 327/37 |
| 4,371,900 | 2/1983 | Huber | 360/46 |
| 4,760,472 | 7/1988 | Minuhin et al. | 360/46 |
| 5,027,340 | 6/1991 | Yumura et al. | 369/219 |
| 5,424,668 | 6/1995 | Kohsaka | 360/46 |
| 5,440,433 | 8/1995 | Yun | 360/46 |

*Primary Examiner*—Aristotelis M. Psitos
*Assistant Examiner*—Regina Y. Neal
*Attorney, Agent, or Firm*—Leydig, Voit & Mayer, Ltd.

[57] ABSTRACT

A circuit for detecting contact of a magneto-resistive (MR) head with a disk surface by properly sensing disturbance signals without being effected by noises using a simple configuration. The circuit for detecting contact of the MR head with the disk surface by sensing a disturbance waveform generated by MR head contact with the disk surface comprises a comparator for comparing a signal read out by MR head with a threshold level $V_{th}$; a pulse width limiting circuit for restricting a pulse width x, which is wider than the predetermined pulse width $x_1$, to a pulse width $x_1$; and a D flip-flop circuit in which an output signal of the comparator being applied to both D terminal and R terminal, and an output signal from the pulse width limiting circuit being applied to T terminal, and an output signal being obtained from an inverted output terminal QC.

3 Claims, 9 Drawing Sheets

FIG. 4A  INPUTTED SIGNAL

FIG. 4B  RDX

FIG. 4C  RDY

FIG. 4D  OUTPUT FROM AMP 82

FIG. 4E  OUTPUT FROM COMP 3

FIG. 4F  OUTPUT FROM PULSE WIDTH LIMITING CIRCUIT 5

FIG. 4G  OUTPUT FROM D-FLIP FLOP CIRCUIT 6

FIG. 4H  OUTPUT FROM PULSE WIDTH LIMITING CIRCUIT 7

FIG. 4I  OUTPUT FROM DISTURBANCE SIGNAL DETECTING CIRCUIT 88

CIRCUIT FOR DETECTING CONTACT OF MR HEAD WITH DISK SURFACE

BACKGROUND OF THE INVENTION

1. Field of the Invention

The invention relates to a hard disk drive, more specifically, relates to a circuit for detecting contact of MR head with the disk surface by a simple circuit configuration, which is used mainly in a read amplifier for driving a head comprised especially of magneto-resistive effect element (referred to as MR head hereinafter).

2. Description of the Prior Art

Figure 7:
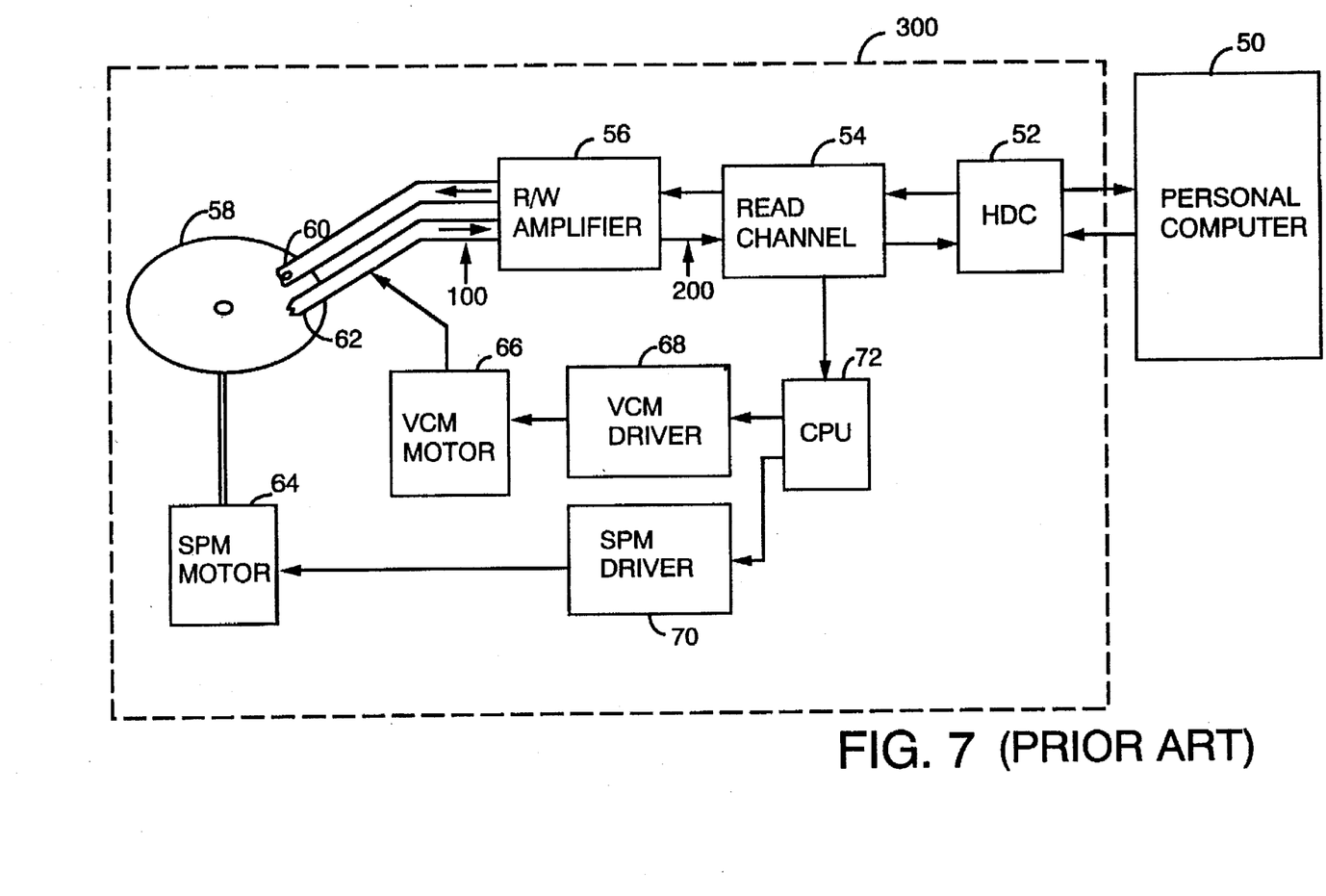
FIG. 7 is a general block diagram of a conventional hard disk drive.

FIG. 7 is a general block diagram of a hard disk drive. In FIG. 7, data recorded on disk 58 are read by MR head 62. Signals read by this MR head 62 are transmitted to a personal computer 50 to be processed, via read/write (R/W) amplifier 56, read channel 54 and hard disk controller (HDC) 52. On the other hand, positions of MR head 62 are controlled to VCM motor 66, via read channel 54, central processing unit (referred to as CPU) 72 and VCM driver 68. The rotation of disk 58 is controlled via read channel 54, CPU 72, SPM driver 70 and SPM motor 64. Disk 58 writes data signals by writing head 60 according to an instruction from a personal computer via HDC 52, read channel 54 and R/W amplifier 56.

Figure 8:
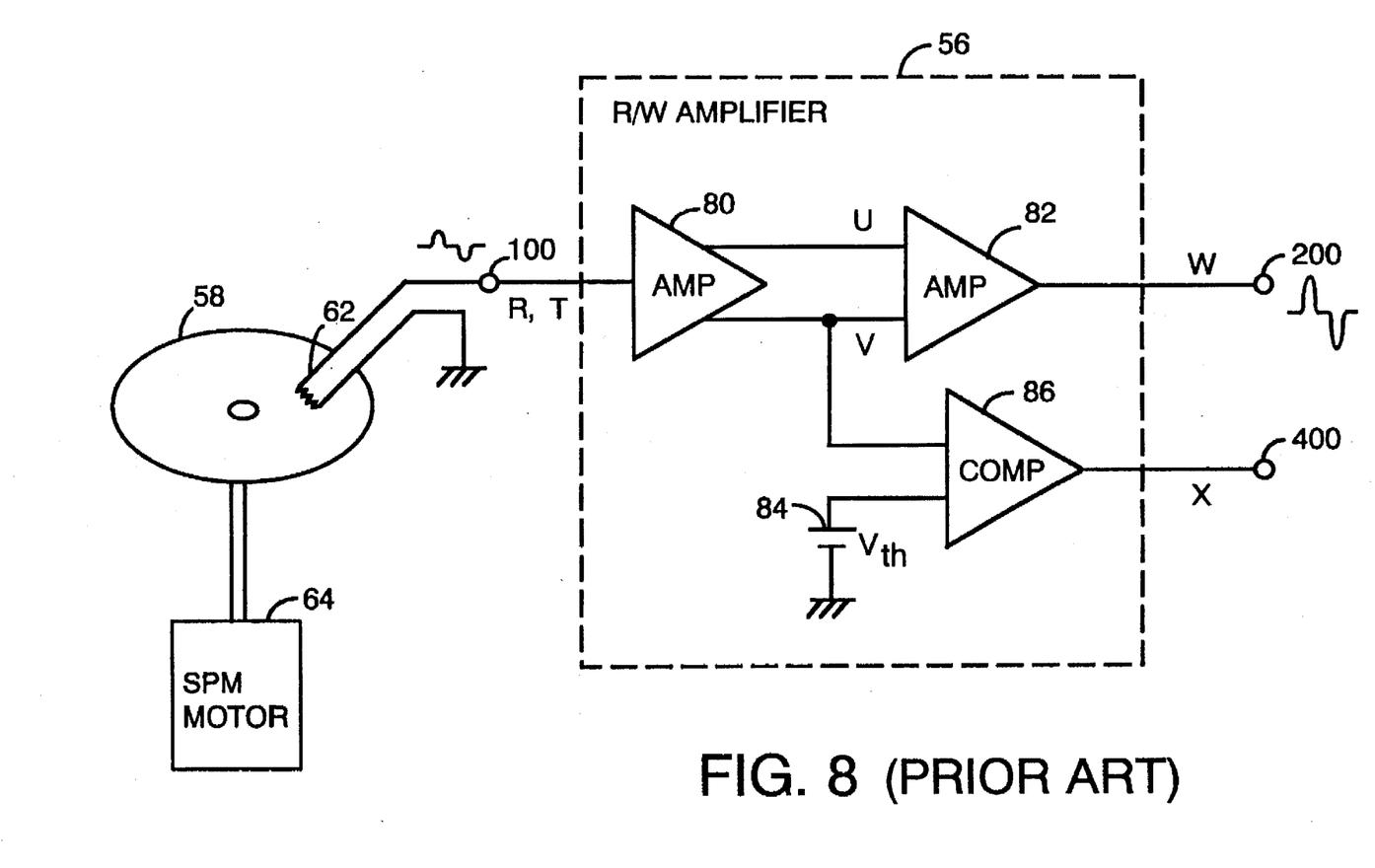
FIG. 8 is a block diagram of a conventional read/write (R/W) amplifier.

FIG. 8 shows a conventional example of read/write (R/W) amplifier 56 shown in FIG. 7. In FIG. 8, signals read from disk 58 using MR head 62 are outputted to output terminal 200 after being amplified by a first amplifier 80 and a second amplifier 82.

On the other hand, if a disturbance caused by MR head 62 is included in a signal amplified by the first amplifier 80, in order to detect such disturbance, the output signal from the first amplifier 80 is compared with a threshold level $V_{th}$ to extract a disturbance signal which has a larger amplitude than the threshold level $V_{th}$. The extracted disturbance signals are used for two purposes, namely, to prevent the disturbance signals from being outputted from R/W amplifier 56, and to carry out such a process as outputting signals to outside circuit from IC so that the hard disk apparatus can read reproduced signals again.

Figure 9R:
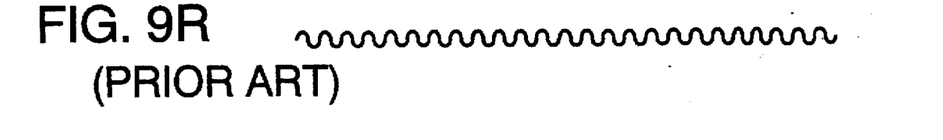
FIGS. 9R–9X shows signals of each part of a conventional R/W amplifier.
Figure 9S:
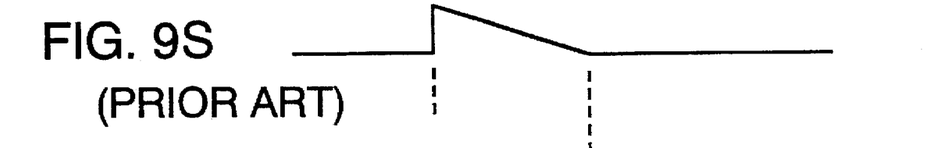
Figure 9T:
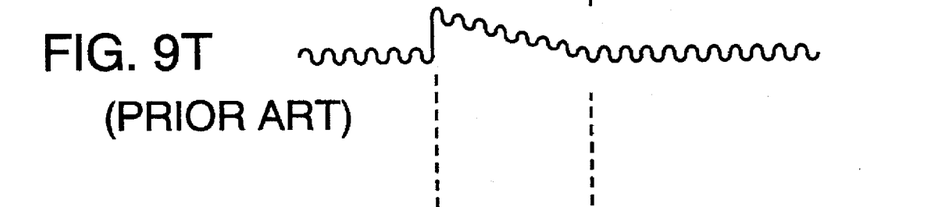

Usually, MR head 62 is used in a floating state such that MR head 62 does not contact the surface of disk 58 of a hard disk drive. FIG. 9 shows signals of each part of a conventional R/W amplifier 56. In a normal state, signals read from MR head 62 have a waveform of uniform and small amplitudes as shown in FIG. 9R. If MR head 62 contacts the surface of disk 58 MR head 62 is heated momentarily and the resistance value of MR head 62 is raised. The contact occurs usually in a moment, and MR head 62 may be apart from disk 58 in the next instance. The heat generated on MR head 62 is however, slowly radiated. As a result, disturbance signal having a long period is generated as shown in FIG. 9S. This disturbance signal of FIG. 9S and a data signal read from disk 58 of FIG. 9R are superposed to compose a data signal as shown in FIG. 9T, which is outputted from MR head 62 to R/W amplifier 56. This phenomena is called "thermal asperity", where the highly heated MR head raises its resistance value, and then a disturbance signal generated due to the rise of the resistance value of the MR head 62 is superposed on the data signal.

Figure 9U:
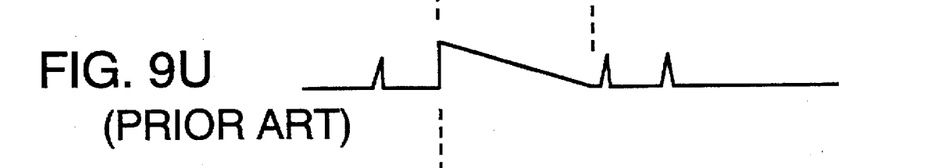
Figure 9V:
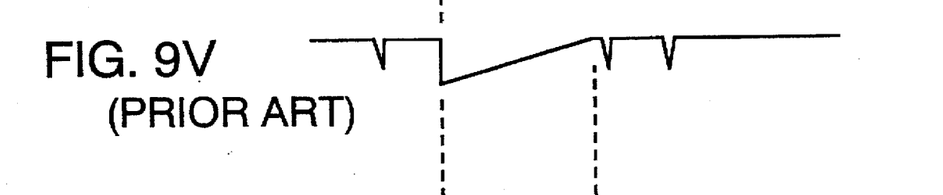
Figure 9W:
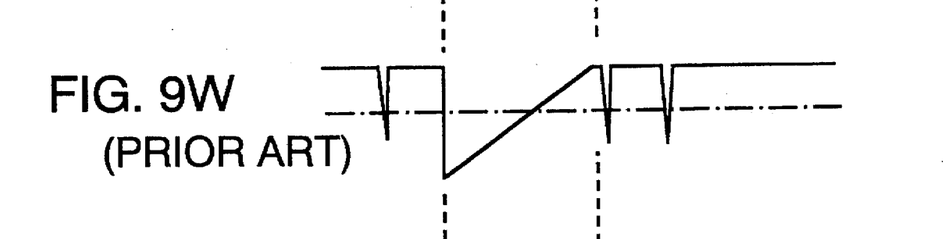
Figure 9X:
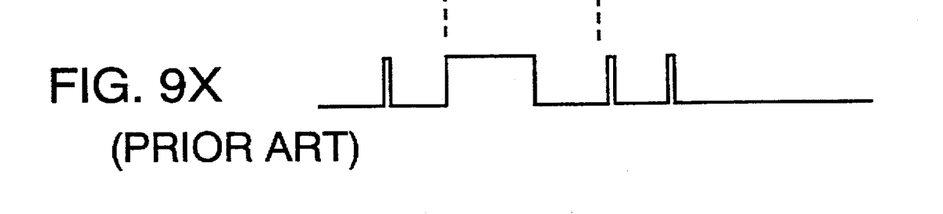

However, when noises are contained in a reproduced signal other than disturbance signals as shown in FIG. 9U, these noises are detected as well as disturbance signals as shown in FIG. 9X. For this reason, since a signal including noises is mistaken for a signal including disturbance signals, reading out the reproduced signal is sometimes stopped by these noises. Although data signal waveform such as in FIG. 9T is actually superposed to each waveform in FIGS. 9U, 9V and 9W, it is omitted for the purpose of drawing simplification.

It is an object of the present invention to provide a circuit for detecting contact of MR head with disk surface which properly detect disturbance signals without being effected by noises using a simple configuration.

SUMMARY OF THE INVENTION

According to one aspect of the present invention, a circuit for detecting contact of MR head with a disk surface comprises: a comparator for comparing a signal read out by the MR head with a threshold level $V_{th}$, a pulse width limiting circuit for restricting a pulse width x, which is wider than the predetermined pulse width $x_1$, to a pulse width $x_1$, and a D flip-flop circuit in which an output signal of the comparator is applied to both D terminal and R terminal, an output signal from the pulse width limiting circuit being applied to T terminal, and an output signal being obtained from an inverted output terminal QC.

According to another aspect of the present invention, a circuit for detecting contact MR head with a disk surface by sensing a disturbance waveform generated by the MR head contact with a disk surface comprises: a comparator for comparing a signal read out by MR head with a threshold level $V_{th}$; a pulse width limiting circuit for restricting a pulse width x, which is wider than the predetermined pulse width $x_1$, to a pulse width $x_1$; a D flip-flop circuit in which an output signal of the comparator being applied to both D terminal and R terminal, and an output signal from the pulse width limiting circuit being applied to T terminal, and an output signal being obtained from an inverted output terminal QC; a second pulse width limiting circuit for generating a pulse having a second predetermined pulse width $x_2$; and a NAND gate for obtaining a signal having a pulse width dose to that of disturbance signals from the MR head by applying an output signal of the D-FF and an output of the second pulse width limiting circuit to input terminals.

According to further aspect of the present invention, a circuit for detecting contact of MR head with the disk surface, wherein the first predetermined pulse width $x_1$ and the second predetermined pulse width $x_2$ are selected to be equal.

DETAILED DESCRIPTION OF THE PREFERRED EMBODIMENTS

Embodiment 1

Figure 1:
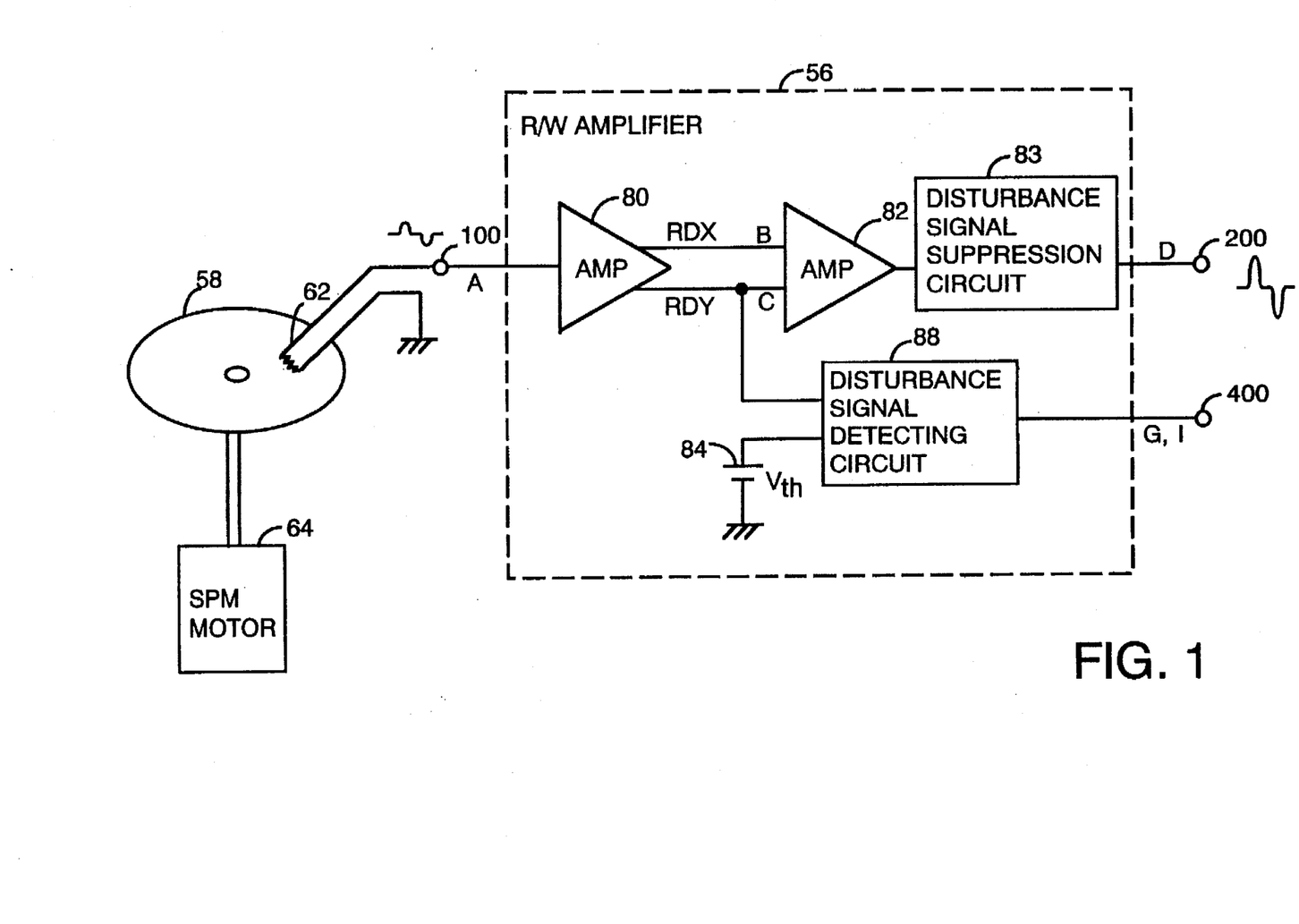
FIG. 1 shows a configuration of read/write (R/W) amplifier according to one of the embodiments of the invention.
Figures 4A, 4B:
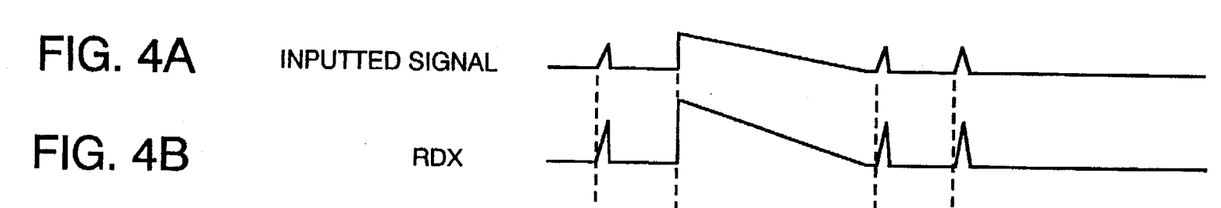
FIGS. 4A-4I show a timing chart for explaining an operation of a circuit for detecting disturbance signals of the invention.

The following is an explanation of embodiments of the present invention, referring to FIG. 1. FIG. 1 shows a configuration of a circuit for detecting contact of an MR head with a disk surface. In FIG. 1, a data signal read from disk 58 by using MR head 62 is inputted to input terminal 100 of the R/W amplifier 56. To this input terminal 100, data signal accompanied with noises, for example, as shown in FIG. 4A is inputted when MR head 62 contacts the surface of the disk 58. In FIGS. 4A–4D, data signal waveforms are not illustrated although such waveforms are also actually superposed on the waveforms of FIGS. 4A–4D as shown in FIG. 9T. In FIG. 1, R/W amplifier 56 comprises a first amplifier 80, a second amplifier 82, a disturbance signal suppression circuit 83 and an output terminal of for the data signal 200. The R/W amplifier 56 also comprises disturbance signal detection circuit 88 for detecting contact of the MR head with a disk surface and an output terminal 400 for outputting disturbance signals detected by the disturbance signal detection circuit 88.

In FIG. 1, when a data signal accompanied with a disturbance signal and noises as shown in FIG. 4A are inputted to input terminal 100, the first amplifier 80 outputs an RDX signal (FIG. 4B) and an RDY signal (FIG. 4C), which have opposite polarities to each other. The second amplifier 82 amplifies the RDX signal, then disturbance signal suppression circuit 83 suppresses the disturbance signal and the noise signal included in the data signal, and then outputs the data signal to output terminal 200. On the other hand, disturbance signal detection circuit 88 compares the RDY signal with a threshold level $V_{th}$ to extract excess portions of the disturbance signal larger than the threshold level $V_{th}$, and then outputs the excess to output terminal 400. This signal is used for two purposes as mentioned above: namely, (1) to prevent the disturbance signals from being outputted from R/W amplifier 56, and (2) to output the signals to outside circuit of IC and to read out reproduced signals again in the hard disk apparatus.

For example, if the output signal from output terminal 200 is not correctly received at an external device such as HDC 52, then HDC 52 requires read channel 54 to read the signal again during the $X_3$ signal output from the disturbance signal detection circuit 88 to output terminal 400.

Figure 2:
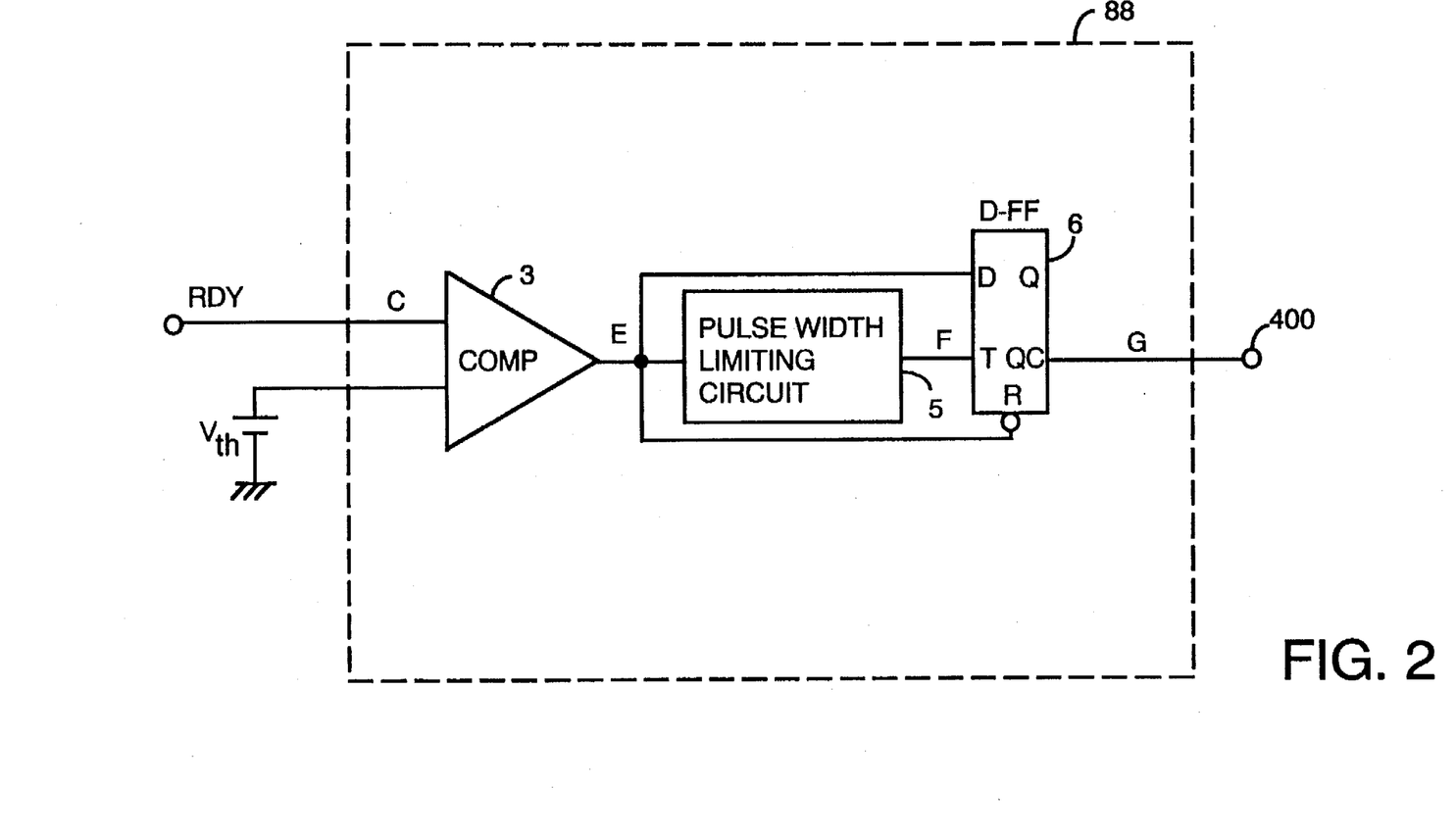
FIG. 2 shows a circuit configuration for detecting disturbance signals according to a first embodiment of the invention.

FIG. 2 shows one of embodiment of the disturbance signal detection circuit 88. A configuration of disturbance signal detection circuit 88 is described in detail below. In FIG. 2, the disturbance signal detection circuit 88 comprises comparator (COMP) 3, pulse width limiting circuit 5 and D flip-flop circuit (D-FF) 6.

Figures 4C, 4D, 4E:
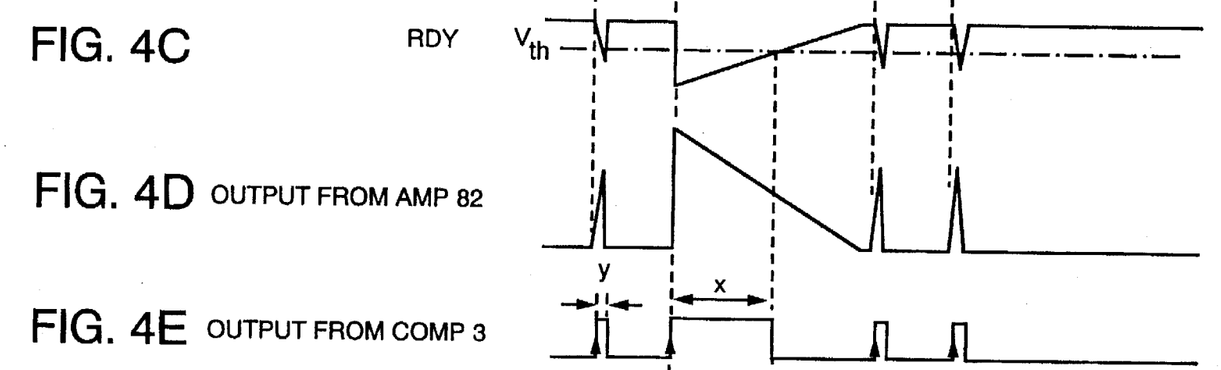

An operation of the disturbance signal detection circuit 88 is explained below. The inverted RDY signal, which is obtained as an output signal from amplifier 80, is applied to an input terminal of comparator 3 in disturbance signal detection circuit 88. The RDY signal is compared with the threshold level $V_{th}$ as shown in FIG. 4C, and only portions of the signal larger than the threshold level $V_{th}$ are outputted as logic "H" of the digital signal as shown in FIG. 4E. Where, x denotes a pulse width of disturbance signal generated at the MR head and y denotes a pulse width of a noise signal. The pulse width limiting circuit 5 starts to operate according to the rising edge of the outputted signal from comparator 3 (FIG. 4E).

Figure 4F:
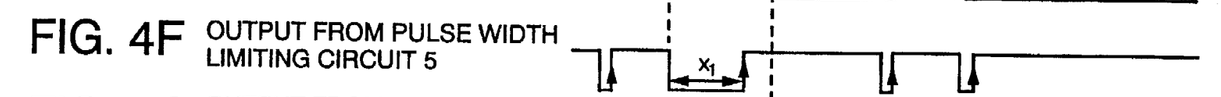

The configuration and operation of pulse width limiting circuit 5 are mentioned in detail later. Pulse width limiting circuit 5 lets an output signal from comparator 3 pass through undisturbed if its pulse width is narrower than a predetermined width $x_1$, while if a pulse width is wider than a predetermined width $x_1$, this pulse width limiting circuit 5 limits the pulse width to the pulse width $x_1$. In general, the width of noise signals is very narrow, while the width of disturbance signals of the MR head is very wide. Accordingly, if such a signal shown in FIG. 4E is inputted to pulse width limiting circuit 5, noise signals pass through the circuit 5 undisturbed, while disturbance signals of the MR head are outputted after the width has been limited to the pulse width $x_1$ (FIG. 4F).

Figures 4G, 4H:
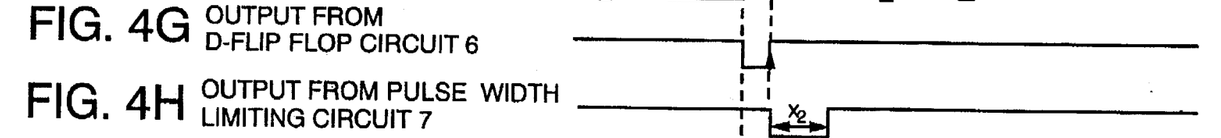
Figure 4I:
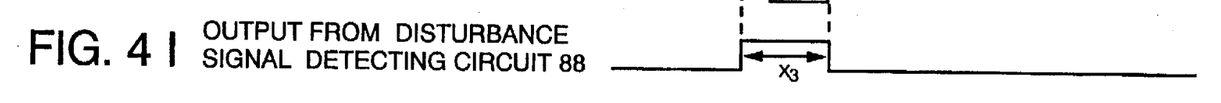

D flip-flop circuit 6 holds a signal inputted to the D terminal when a signal applied to the T terminal rises. Furthermore, this D flip-flop circuit 6 has a reset terminal R. When a signal applied to the reset terminal R is logical "H", the logical output of the Q terminal in D-flip-flop circuit 6 becomes "L", and the logical output of the QC terminal becomes "H". Accordingly, if a waveform of signal of FIG. 4E is "H" at the rising edge of the signal of FIG. 4F, a waveform outputted from QC terminal of the D flip-flop circuit 6 becomes "L" as shown in FIG. 4G. In other words, if the pulse width of the waveform the FIG. 4E is wider than $x_1$, the logical level of the excess portion becomes "L". On the other hand, if a pulse width is narrower than the predetermined width $x_1$ like a noise, the output from D flip-flop circuit 6 remains "H", since the phase of the rising edge of the signal of FIG. 4F is slightly behind the phase of the falling edge of the signal of FIG. 4E, namely the signal waveform FIG. 4E becomes "L" at the rising edge of the signal FIG. 4F. Therefore, the output waveform (FIG. 4G) of D flip-flop circuit 6 becomes "L" level at the portion from the end of time $x_1$ to the end of time x, and other portions are "H" level. Where, x denotes a pulse width of the disturbance signal of the MR head.

Embodiment 2

Figure 3:
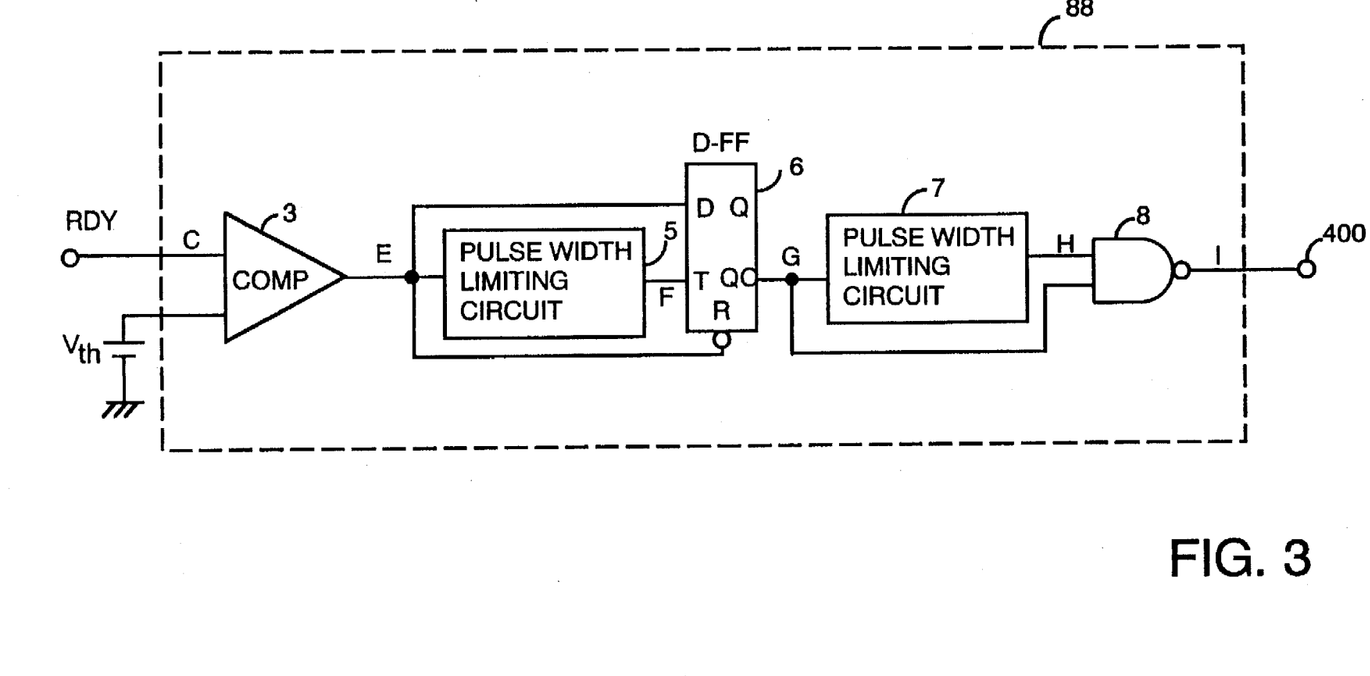
FIG. 3 shows a circuit configuration for detecting disturbance signals according to a second embodiment of the invention.

FIG. 3 shows a circuit of a second embodiment of the present invention in which another pulse width limiting circuit 7 is further added to the circuit of the first embodiment. The second embodiment can provide a wider waveform as shown in FIG. 4 I than that of the first embodiment (FIG. 4G). The second embodiment is explained below. Since the process is the same until the output signal of FIG. 4G in D flip-flop circuit 6 is obtained, the detailed expiation is omitted. When a waveform of FIG. 4G outputted from D flip-flop circuit 6 is inputted to pulse width limiting circuit 7, the pulse width limiting circuit 7 outputs a pulse having a pulse width $x_2$ at the rising edge of the waveform FIG. 4G. Both the output (FIG. 4G) of D flip-flop circuit 6 and the output (FIG. 4H) from pulse width limiting circuit 7 are applied to NAND gate 8 to get a pulse having a pulse width $x_3$. This pulse width $x_3$ may be the same width as that of the pulse x which corresponds to the disturbance signal of the MR head (FIG. 4E) by adjusting the pulse width $x_2$. The pulse width x3 can be the same as that of pulse width x of the disturbance signal of the MR head (FIG. 4E). This pulse width x3 may be used, for example, as a control signal which reads out again the data during that period $x_3$ (=x) at an external circuit such as a disk drive.

Embodiment 3

Figure 5:
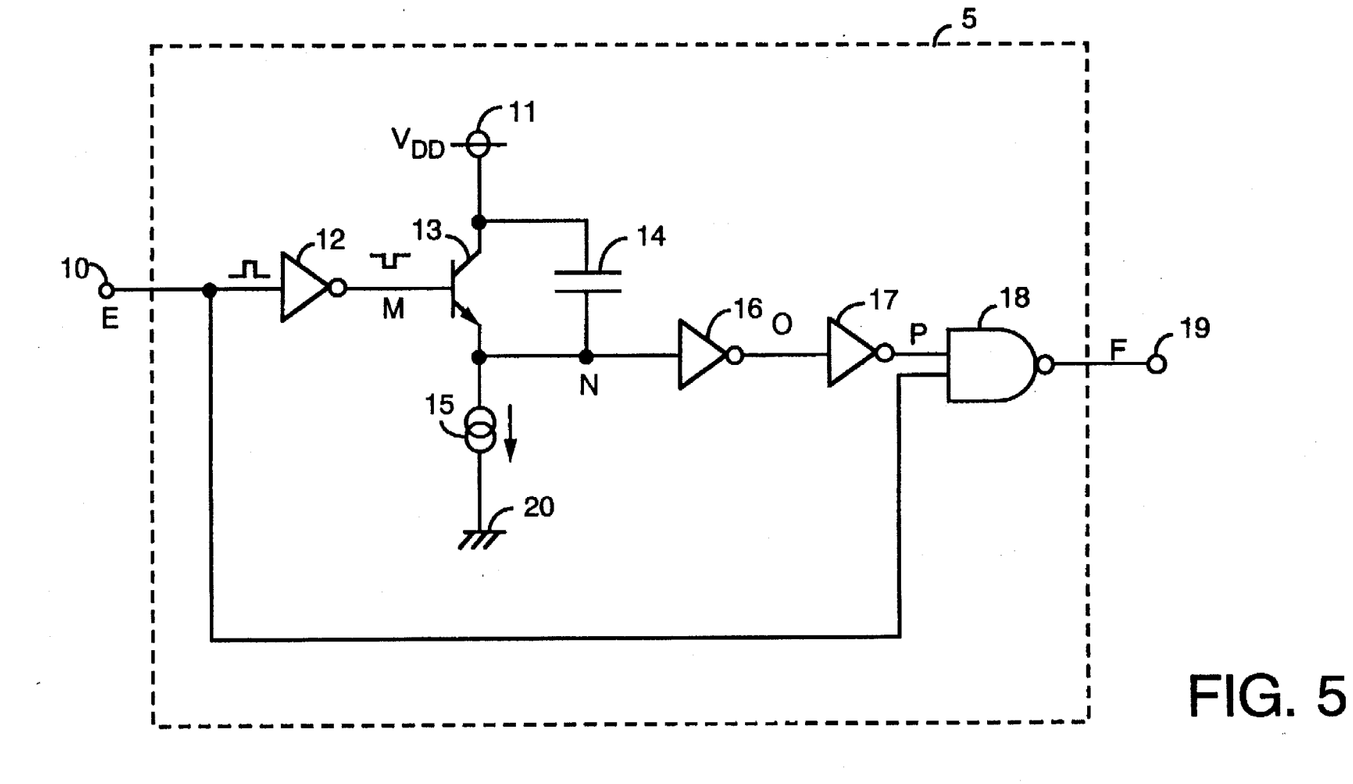
FIG. 5 shows a configuration of a pulse width limiting circuit of the invention.
Figure 6E:
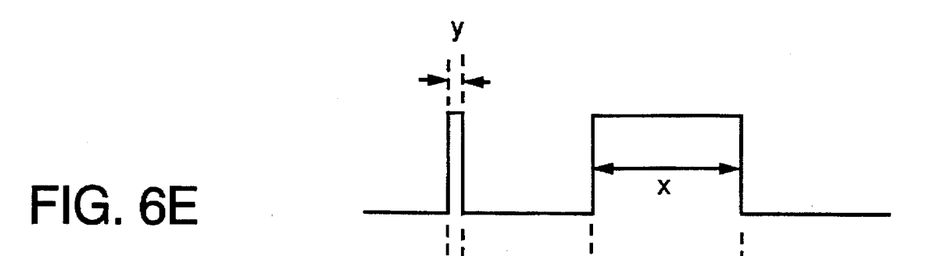
FIGS. 6E-6F and 6M-6P shows a timing chart for explaining the operation of a pulse width limiting circuit of the invention.
Figure 6F:
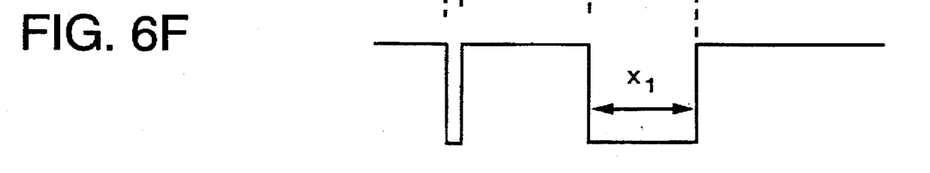
Figure 6M:
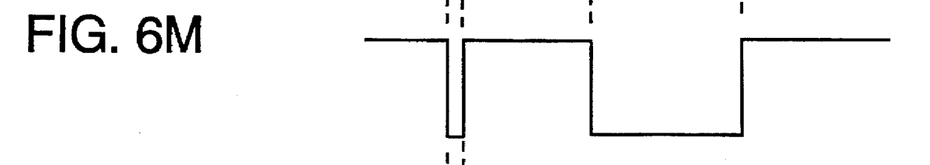
Figure 6N:
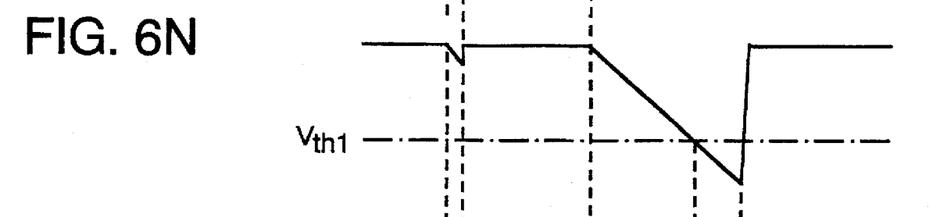
Figure 6O:
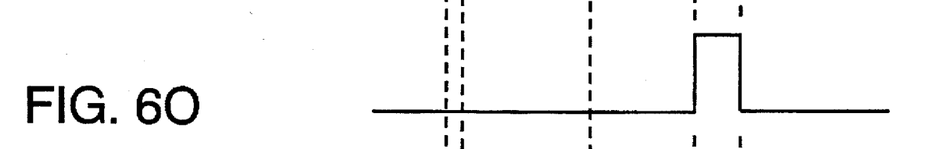
Figure 6P:
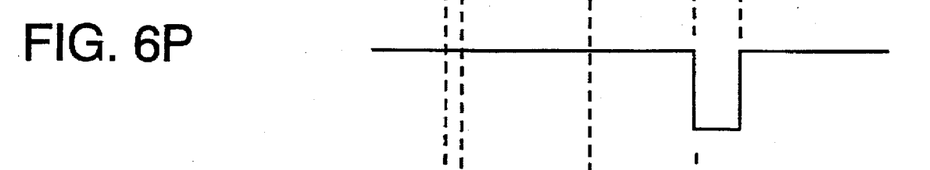

FIG. 5 shows a detailed configuration of pulse width limiting circuit 5. FIG. 6 shows a timing chart for explaining the operation of pulse width limiting circuit 5. In FIG. 5, pulse width limiting circuit 5 comprises an input terminal 10, a power supply 11, inverters 12,16,17, a transistor 13, a constant current source 15, a capacitor 14, an NAND gate 18, and an output terminal 19. In this pulse width limiting circuit 5, when a waveform of an inputted signal becomes "H" as shown in FIG. 6E, the output of inverter 12 becomes "L" as shown in FIG. 6M, then transistor 13 turns off and capacitor 14 is electrically charged, and the emitter voltage of transistor 13 decreases as shown in FIG. 6N. The declination rate of the emitter voltage of transistor 13 may be adjusted according to values of the capacitor 14 and constant current source 15. If the emitter voltage becomes lower than a threshold level $V_{th1}$, a positive pulse, which corresponds to the period of the lower emitter voltage than the threshold level $V_{th1}$, is outputted from 16 and the inverted pulse is outputted from inverter 17 as shown in FIG. 6O and FIG. 6P, respectively. In case of a noise signal waveform (pulse width=y) like FIG. 6E, the voltage of capacitor 14 never fall down below the threshold level $V_{th1}$ as shown in FIG. 6N, since the pulse width y of the noise signal is very narrow. Accordingly, the polarities of the inverters 16 and 17 do not change during the pulse width y. For this reason, an output (FIG. 6F) from NAND gate 18 has the same width as that of an inputted signal (FIG. 6E) during the period of the noise signal, but only the polarity is inverted.

On the other hand, in case of disturbance signals of the MR head, the pulse width of the input signal is x as shown in FIG. 6E. In FIG. 6N, the time period $x_1$ (a period when the emitter voltage falls until the threshold level $V_{th1}$ by charging capacitor 14) is set shorter than the pulse width x. In this case, when the emitter voltage (FIG. 6N) becomes lower than the threshold level $V_{th1}$, the polarities of inverters 16,17 are inverted as shown in FIG. 6O and 6P. Accordingly, signal waveforms in FIG. 6P and FIG. 6E are applied to input terminals of NAND gate 18, and therefore, signals having a pulse width $x_1$ are outputted from NAND gate 18 as shown in FIG. 6F. As mentioned above, in the pulse width limiting circuit 5, even if a signal having a wide pulse width like a disturbance signal of MR head is inputted, the pulse width limiting circuit 5 limits its pulse width to predetermined pulse width $x_1$. Since the operation in the pulse width limiting circuit 7 is the same, the detailed explanation is omitted.

What is claimed is:

1. A circuit for detecting contact of a magneto-resistive (MR) head with a disk surface by sensing a disturbance waveform generated by MR head contact with said disk surface comprising:

a comparator for comparing a signal read out by the MR head with a threshold level $V_{th}$;

a pulse width limiting circuit for restricting a pulse width x to a predetermined pulse width $x_1$, said pulse width x being wider than the predetermined pulse width $x_1$; and a D flip-flop circuit in which an output signal of said comparator is applied to both D terminal and R terminal, and an output signal from said pulse width limiting circuit is applied to T terminal, and an output signal is obtained from an inverted output terminal QC.

2. A circuit for detecting contact of a magneto-resistive (MR) head with a disk surface by sensing a disturbance waveform generated by MR head contact with said disk surface comprising:

a comparator for comparing a signal read out by the MR head with a threshold level $V_{th}$;

a pulse width limiting circuit for restricting a pulse width x to a first predetermined pulse width $x_1$, said pulse width x being wider than the first predetermined pulse width $x_1$;

a D flip-flop circuit in which an output signal of said comparator is applied to both D terminal and R terminal, and an output signal from said pulse width limiting circuit is applied to T terminal, and an output signal is obtained from an inverted output terminal QC;

a second pulse width limiting circuit for generating a pulse having a second predetermined pulse width $x_2$; and a NAND gate for obtaining a signal having a pulse width close to that of disturbance signals from the MR head by applying an output signal of said D-FF and an output of said second pulse width limiting circuit to input terminals.

3. A circuit for detecting contact of a magneto-resistive (MR) head with a disk surface of claim 2: wherein said first predetermined pulse width $x_1$ and said second predetermined pulse width $x_2$ are selected to be equal.

* * * * *